US009446321B1

United States Patent
Graham et al.

(10) Patent No.: US 9,446,321 B1
(45) Date of Patent: Sep. 20, 2016

(54) PUBLIC GAMEPLAY

(75) Inventors: M. Ian Graham, San Francisco, CA (US); Ya-Bing Chu, San Francisco, CA (US); Randall William Allred, Jr., San Francisco, CA (US); Christopher Delbuck, Berkeley, CA (US)

(73) Assignee: Zynga Inc., San Francisco, CA (US)

( * ) Notice: Subject to any disclaimer, the term of this patent is extended or adjusted under 35 U.S.C. 154(b) by 131 days.

(21) Appl. No.: 13/433,603

(22) Filed: Mar. 29, 2012

(51) Int. Cl.
| A63F 9/24 | (2006.01) |
| A63F 13/00 | (2014.01) |
| A63F 13/85 | (2014.01) |
| A63F 13/795 | (2014.01) |

(52) U.S. Cl.
CPC ............ *A63F 13/85* (2014.09); *A63F 13/795* (2014.09)

(58) Field of Classification Search
CPC ....... A63F 13/85; A63F 13/86; A63F 13/795
USPC ..................................................... 463/40, 43
See application file for complete search history.

(56) References Cited

U.S. PATENT DOCUMENTS

| 6,231,441 | B1 | 5/2001 | Golad |
| 6,830,513 | B1* | 12/2004 | Ballard ............ 463/14 |
| 7,632,186 | B2* | 12/2009 | Spanton et al. ............ 463/40 |
| 7,828,661 | B1* | 11/2010 | Fish et al. ............ 463/42 |
| 8,314,793 | B2 | 11/2012 | Beckman et al. |
| 9,254,443 | B1 | 2/2016 | Graham et al. |
| 2004/0235546 | A1* | 11/2004 | Ballard ............ 463/9 |
| 2004/0242332 | A1 | 12/2004 | Walker et al. |
| 2006/0046816 | A1 | 3/2006 | Walker et al. |
| 2006/0068870 | A1* | 3/2006 | Crawford et al. ............ 463/13 |
| 2006/0205472 | A1 | 9/2006 | Sines et al. |
| 2007/0005704 | A1* | 1/2007 | Heron et al. ............ 709/206 |
| 2007/0117617 | A1* | 5/2007 | Spanton et al. ............ 463/29 |
| 2007/0243928 | A1 | 10/2007 | Iddings |
| 2008/0026826 | A1 | 1/2008 | Groswirt |
| 2008/0102923 | A1 | 5/2008 | Esses et al. |
| 2009/0005145 | A1 | 1/2009 | White |
| 2009/0063463 | A1 | 3/2009 | Turner et al. |
| 2009/0094535 | A1 | 4/2009 | Bromenshenkel et al. |
| 2009/0198576 | A1 | 8/2009 | Rogers, Jr. |
| 2010/0004055 | A1* | 1/2010 | Gormley et al. ............ 463/25 |
| 2010/0041472 | A1 | 2/2010 | Gagner et al. |
| 2010/0041475 | A1 | 2/2010 | Zalewski et al. |
| 2010/0124959 | A1 | 5/2010 | Demsetz et al. |
| 2010/0217613 | A1* | 8/2010 | Kelly ............ 705/1.1 |
| 2010/0285858 | A1* | 11/2010 | Clowes et al. ............ 463/9 |
| 2011/0269548 | A1* | 11/2011 | Barclay et al. ............ 463/42 |

(Continued)

OTHER PUBLICATIONS

"U.S. Appl. No. 13/436,112, Non Final Office Action mailed May 17, 2013", 16 pgs.

(Continued)

*Primary Examiner* — Lawrence Galka
(74) *Attorney, Agent, or Firm* — Schwegman Lundberg & Woessner, P.A.

(57) ABSTRACT

A system, computer-readable storage medium storing at least one program, and a computer-implemented method for providing public gameplay is provided. Gameboard display data is generated to display a gameboard of a game. A move associated with the game is received from a client device of a player. The gameboard display data and move display data are provided to the client device to display the move on the gameboard. The gameboard display data and the move display data are also sent to a broadcast server to display the move on the gameboard via a public medium.

11 Claims, 11 Drawing Sheets

(56) References Cited

U.S. PATENT DOCUMENTS

| | | |
|---|---|---|
| 2011/0281648 A1 | 11/2011 | Weising |
| 2012/0041907 A1 | 2/2012 | Wang et al. |
| 2012/0303491 A1 | 11/2012 | Hill et al. |
| 2013/0310125 A1 | 11/2013 | Tsiounis |

OTHER PUBLICATIONS

"Infogames Scrabble Complete Manual", (2002), 16 pgs.

"U.S. Appl. No. 13/485,685, Non Final Office Action mailed Jun. 19, 2013", 9 pgs.

Scrabulizer, "", [Online] Retrieved From Internet: <http://web.archive.org/web/20101231174841 /http://www. scrabulizer.com>, (Jan. 2, 2011).

"U.S. Appl. No. 13/436,112 , Response filed Oct. 17, 2013 to Non Final Office Action mailed May 17, 2013", 9 pgs.

"U.S. Appl. No. 13/436,112, Examiner Interview Summary mailed Sep. 6, 2013", 3 pgs.

"U.S. Appl. No. 13/436,112, Final Office Action mailed Dec. 11, 2013", 18 pgs.

"U.S. Appl. No. 13/485,685 , Response filed Oct. 21, 2013 to Non Final Office Action mailed Jun. 19, 2013", 9 pgs.

"U.S. Appl. No. 13/485,685, Examiner Interview Summary mailed Sep. 19, 2013", 3 pgs.

"U.S. Appl. No. 13/485,685, Final Office Action mailed Nov. 15, 2013", 9 pgs.

Dingus, Betty, "American Simpsons Scrabble vs. The British Version Board Game Geek", [Online] Retrieved From Internet: <http://boardgamegeek.com/filepage/28141/american-simpsons-scrabble-vs-the-british-version>, (Nov. 27, 2007), 4 pgs.

Civilization V Manual, [Online]. Retrieved from Internet: <http://www.2kgames.com/manual/civ5/>>, (Apr. 25, 2011), 234 pgs.

"U.S. Appl. No. 13/436,112, Examiner Interview Summary mailed Jan. 27, 2014", 3 pgs.

"U.S. Appl. No. 13/436,112, Non Final Office Action mailed Jan. 28, 2015", 19 pgs.

"U.S. Appl. No. 13/436,112, Response filed Mar. 11, 2014 to Final Office Action dated Dec. 11, 2013", 10 pgs.

"U.S. Appl. No. 13/485,685, Advisory Action mailed Nov. 26, 2014", 3 pgs.

"U.S. Appl. No. 13/485,685, Appeal Brief filed Feb. 17, 2015", 23 pgs.

"U.S. Appl. No. 13/485,685, Decision on Pre-Appeal Brief Request mailed Jan. 12, 2015", 2 pgs.

"U.S. Appl. No. 13/485,685, Final Office Action mailed Jun. 13, 2014", 14 pgs.

"U.S. Appl. No. 13/485,685, Non Final Office Action mailed Feb. 25, 2014", 11 pgs.

"U.S. Appl. No. 13/485,685, Pre-Appeal Brief Request filed Dec. 15, 2014", 6 pgs.

"U.S. Appl. No. 13/485,685, Response filed Feb. 10, 2014 to Final Office Action mailed Nov. 15, 2013", 10 pgs.

"U.S. Appl. No. 13/485,685, Response filed Apr. 13, 2014 to Non Final Office Action mailed Feb. 25, 2014", 13 pgs.

"U.S. Appl. No. 13/485,685, Response filed Nov. 13, 2014 to Final Office Action dated Jun. 13, 2014", 17 pgs.

"U.S. Appl. No. 13/436,112, Final Office Action mailed May 19, 2015", 23 pgs.

"U.S. Appl. No. 13/436,112, Response filed Apr. 28, 2015 to Non Final Office Action mailed Jan. 28, 2015", 22 pgs.

"U.S. Appl. No. 13/436,112, Response filed Sep. 16, 2015 to Final Office Action mailed May 19, 2015", 23 pgs.

"U.S. Appl. No. 13/436,112, Notice of Allowance mailed Sep. 30, 2015", 9 pgs.

"U.S. Appl. No. 13/485,685, Examiner's Answer to Appeal Brief mailed Jul. 6, 2015", 9 pgs.

"U.S. Appl. No. 13/485,685, Final Office Action mailed Dec. 15, 2015", 13 pgs.

"U.S. Appl. No. 13/485,685, Non Final Office Action mailed Mar. 21, 2016", 14 pgs.

"U.S. Appl. No. 13/485,685, Response filed Feb. 29, 2016 to Final Office Action mailed Dec. 15, 2015", 25 pgs.

"U.S. Appl. No. 14/984,479, Preliminary Amendment filed Dec. 31, 2015", 10 pgs.

\* cited by examiner

PUBLIC GAMEPLAY

TECHNICAL FIELD

The present disclosure relates to games and applications in general and in particular to computer-implemented games. In an example embodiment, a game being played by one or more players may be broadcast via a public medium.

BACKGROUND

The popularity of computer-implemented games is ever-growing, and this popularity has been recognized by many entities acquiring value through the popularity of these games. For example, advertising through the user interfaces for these games has become an effective way to market products and services to consumers playing these games. Additionally, organizations may similarly use these games as an outlet to advocate or advertise the organizations' goals or events.

While these games may be useful platforms for communicating to players, the effect of such communication is limited to the particular players playing the game through which the communication occurs.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Figure 1:
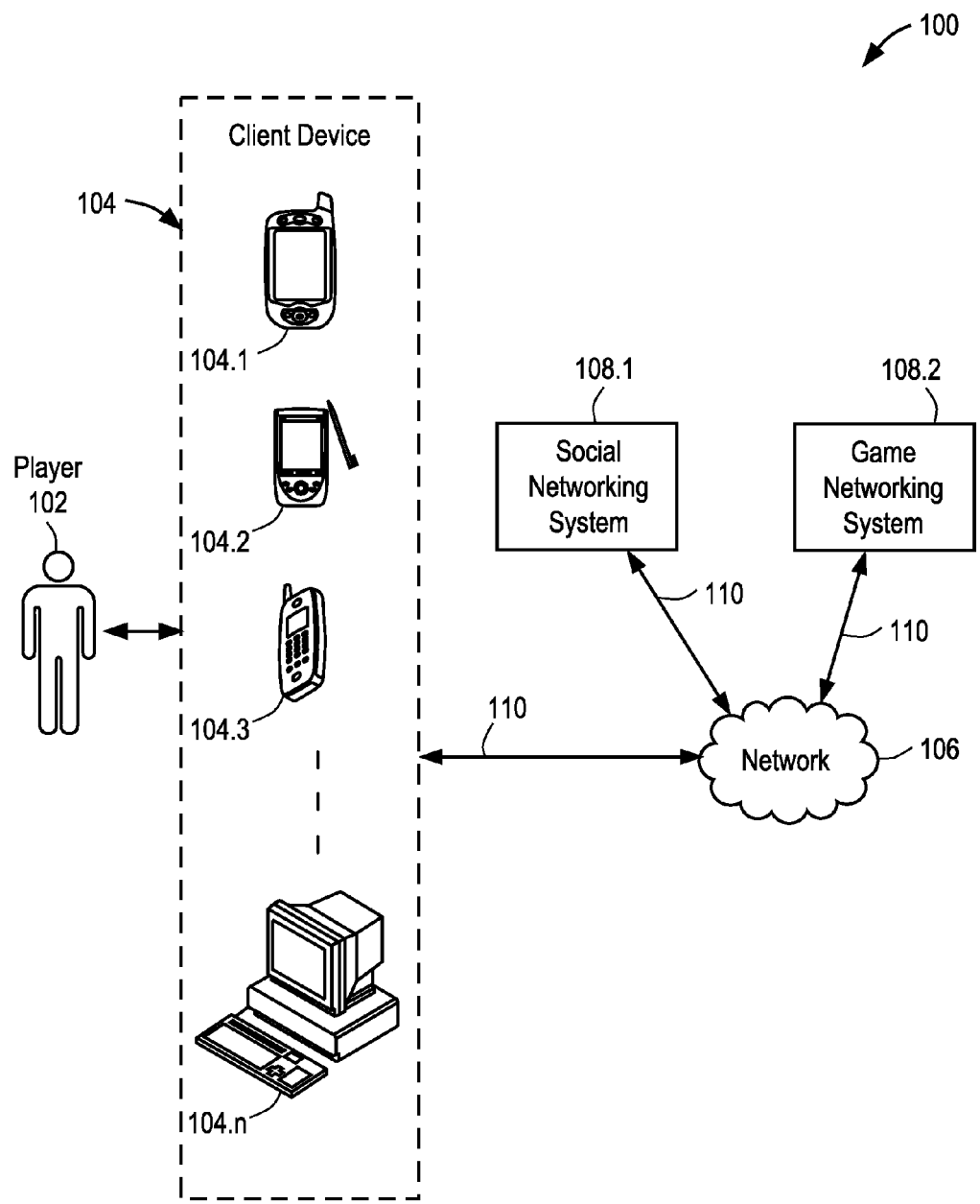
FIG. 1 is a schematic diagram showing an example of a system, according to some embodiments.

Example systems and methods of public gameplay are described. In the following description, for purposes of explanation, numerous specific details are set forth in order to provide a thorough understanding of example embodiments. It will be evident, however, to one skilled in the art that the described systems and methods may be practiced without these specific details.

Players of one or more computer-implemented virtual games may be provided with the ability to play a game that is broadcast via a publicly-accessible medium. The broadcast may include the sending of data to one or more client devices and the receiving of data from the one or more client devices. The public medium may include any medium accessible to the public, either with or without registration of the person accessing the medium. Examples of the public medium includes a publicly-accessible website, a television broadcast, etc. The game that is broadcast may be any computer-implemented game. In some embodiments, the game being played may be a game which allows a player to take his or her turn any length of time after the player's opponent took his or her turn. For example, Player A may take his or her turn by making a move on a gameboard, after which Player B may take his or her turn by making a move on a gameboard. However, any amount of time may lapse between the time Player A makes a move and the time Player B makes a move, as the manner in which each player takes their turn is unrestricted by time. In some embodiments, the game being played may be a game in which the players' moves are responsive to one another.

When the players play a game, the details of the gameplay may be accessed and broadcast by a public medium such that the general public may be able to view the game being played between the players. The publicly-displayed game may serve as a platform for communication to the public by any entity. For example, advertisements for goods and/or services may be displayed next to the gameboard for the game publicly played via the medium.

In some embodiments, the occurrence of the game itself may serve to promote a particular cause (e.g., a charity, promotion of a product, etc.). For example, the players of the publicly-displayed game may include one or more public figures (e.g., celebrities, politicians, etc.). A game played publicly by one or more public figures may encourage a greater number of people to view the game on the medium. For example, a game between two celebrity players may be viewed on the medium, where each celebrity plays the game in support of a particular cause. The game may be promoted to the public to raise awareness for the cause.

In some embodiments, the public gameplay may be advertised such that potential players may enter a raffle or auction to publicly play a game. For example, potential players may enter a raffle or auction to enter to win a chance to play a public figure promoting a particular cause. Any proceeds collected as a result of the raffle or auction may be used toward the cause promoted by the public figure. A potential player may be entered into the pool of potential players in any number of ways, as will be described in more detail below.

Example System

FIG. 1 is a schematic diagram showing an example of a system 100 for implementing various example embodiments. In some embodiments, the system 100 comprises a player 102, a client device 104, a network 106, a social networking system 108.1, and a game networking system 108.2. The components of the system 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The client device 104 may be any suitable computing device (e.g., devices 104.1-104.n), such as a smart phone 104.1, a personal digital assistant 104.2, a mobile phone 104.3, a personal computer 104.n, a laptop, a computing tablet, or any other device suitable for playing a virtual game. The client device 104 may access the social networking system 108.1 or the game networking system 108.2 directly, via the network 106, or via a third-party system. For example, the client device 104 may access the game networking system 108.2 via the social networking system 108.1. The client device 104 may be any suitable computing device, such as a personal computer, laptop, cellular phone, smart phone, computing tablet, etc.

The social networking system 108.1 may include a network-addressable computing system that can host one or more social graphs (see for example FIG. 2), and may be accessed by the other components of system 100 either directly or via the network 106. The social networking system 108.1 may generate, store, receive, and transmit social networking data. Moreover, the game networking system 108.2 may include a network-addressable computing system (or systems) that can host one or more virtual games, for example, online games. The game networking system 108.2 may generate, store, receive, and transmit game-related data, such as, for example, game account data, game input, game state data, and game displays. The game networking system 108.2 may be accessed by the other components of system 100 either directly or via the network 106. The player 102 may use the client device 104 to access, send data to, and receive data from the social networking system 108.1 and/or the game networking system 108.2. In various example embodiments, the game networking system 108.2 may include an introduction mechanic that can introduce a player of the game networking system 108.2 to other players of the game networking system 108.2 that are encountering a common in-game obstacle.

Although FIG. 1 illustrates a particular example of the arrangement of the player 102, the client device 104, the social networking system 108.1, the game networking system 108.2, and the network 106, this disclosure includes any suitable arrangement or configuration of the player 102, the client device 104, the social networking system 108.1, the game networking system 108.2, and the network 106.

Figure 2:
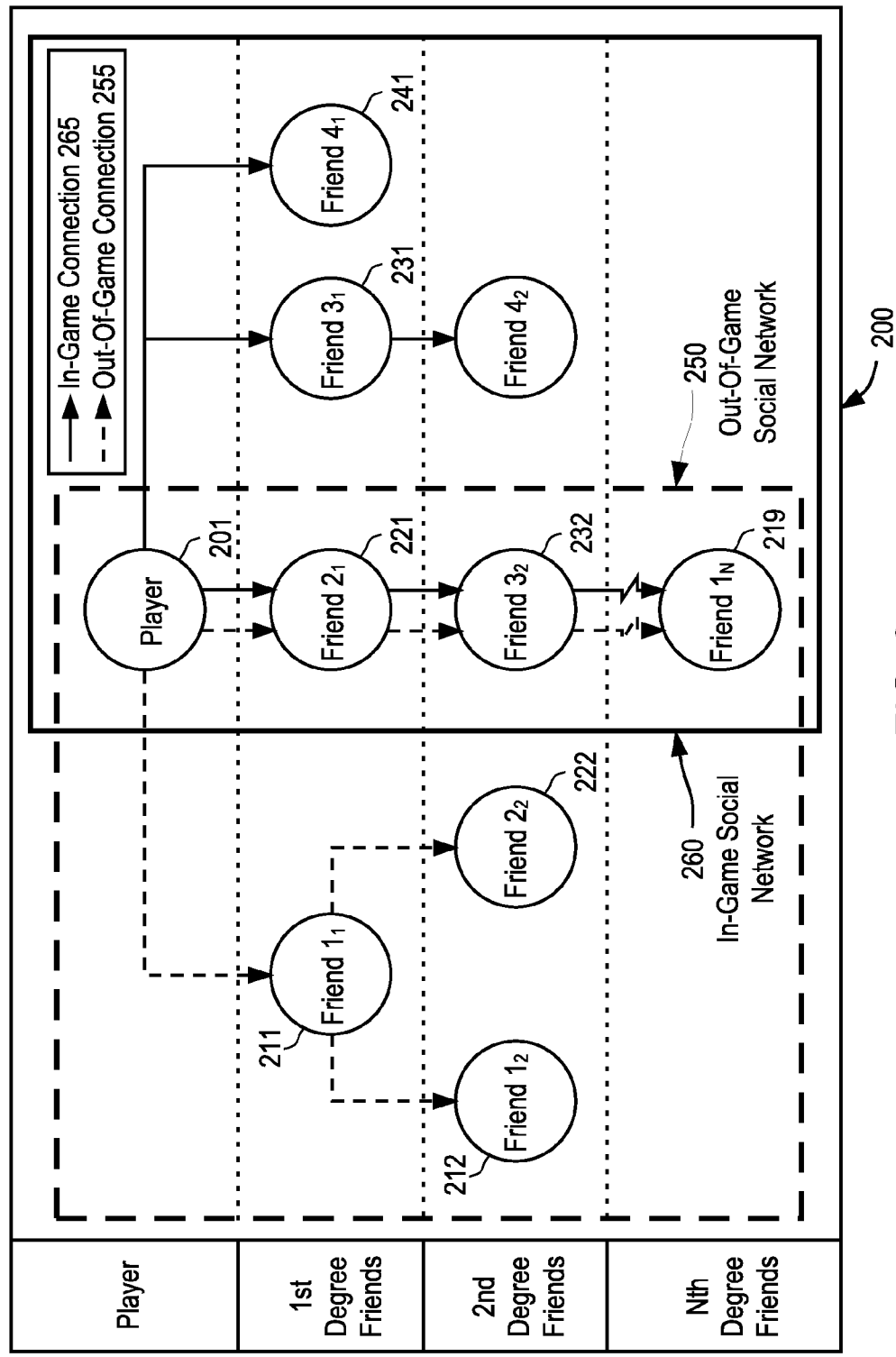
FIG. 2 is a schematic diagram showing an example of a social network within a social graph, according to some embodiments.

FIG. 2 is a schematic diagram showing an example of a social network within a social graph 200. The social graph 200 is shown by way of example to include an out-of-game social network 250, and an in-game social network 260. Moreover, in-game social network 260 may include one or more players that are friends with Player 201 (e.g., Friend 231), and may include one or more other players that are not friends with Player 201. The social graph 200 may correspond to the various players associated with one or more virtual games.

Example Gameplay Between Players

It is to be appreciated that the virtual gameboard for a game may be presented to players in a variety of manners. In some embodiments, a gameboard of a game may be displayed to players of the game via each player's game user interface. Data associated with the game being played may be broadcast to the public via a public medium (e.g., website, television broadcast, radio broadcast, etc.). Spectators may utilize the medium to view the game being played by the players.

In some embodiments, the players playing the public game may be players who were selected from a pool of potential players requesting to play the game publicly. A potential player may enter this pool of potential players in any manner (e.g., random drawing, auction, winner of a previously played game, etc.).

Figure 3:
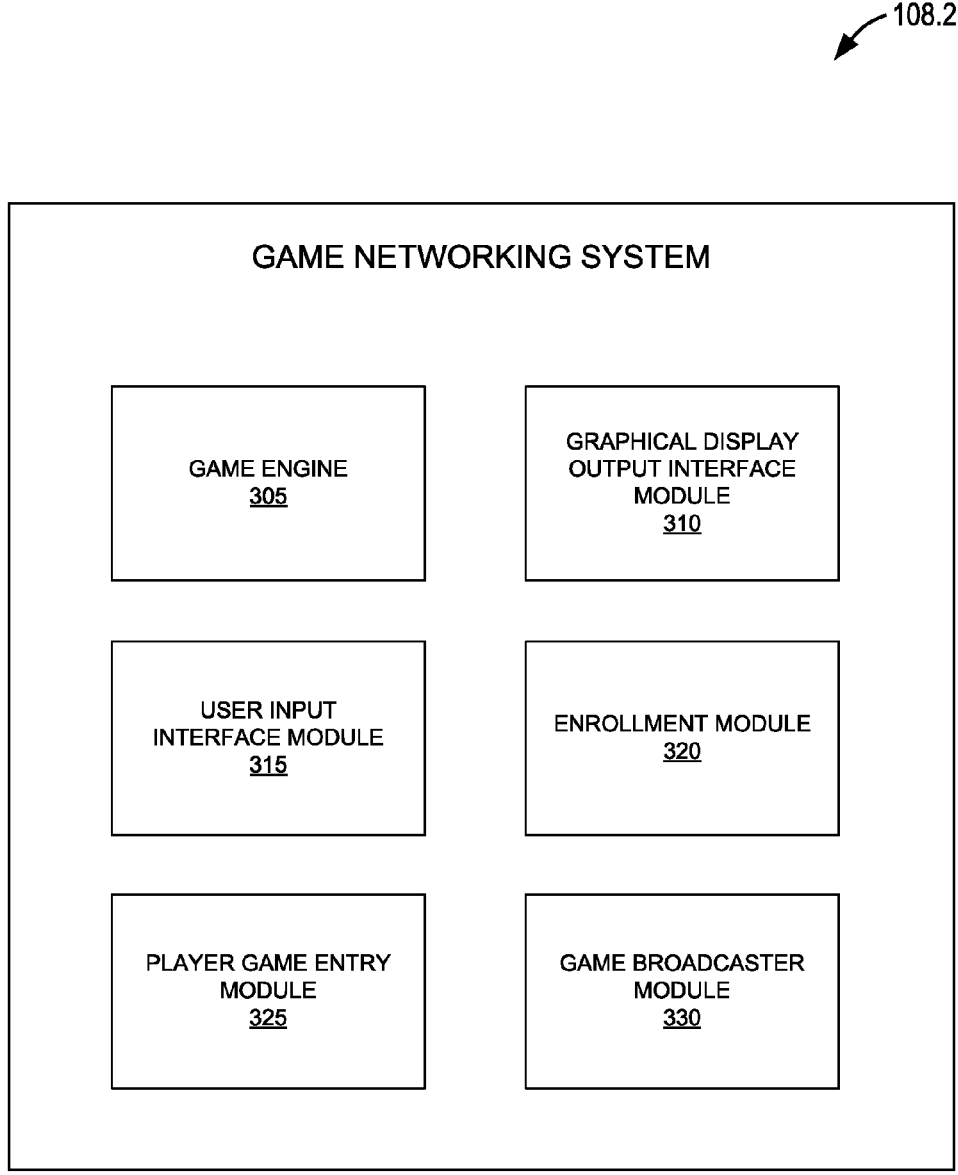
FIG. 3 is a block diagram showing example components of a game networking system, according to some embodiments.

FIG. 3 is a block diagram showing example components of a game networking system 108.2. Game networking system 108.2 may include a game engine 305, a graphical display output interface module 310, a user input interface module 315, an enrollment module 320, a player game entry module 325, and a game broadcaster module 330.

The game engine 305 may be a hardware-implemented module which may control any aspects of a game based on rules of the game, including how a game is played, players' actions and responses to players' actions, etc. The game engine 305 may be configured to generate a game instance of a game of a player and may determine the progression of a game based on user inputs and rules of the game.

The graphical display output interface module 310 may be a hardware-implemented module which may control information or data that is provided to client systems for display on a client device. For example, the graphical user display output module 310 may be configured to provide display data associated with displaying a game instance of a game, including displaying a gameboard of a game, displaying moves made by players on the gameboard of the game, etc.

The user input interface module 315 may be a hardware-implemented module which may receive user inputs for processing by the game engine 305 based on rules of the game. For example, the user input interface module 315 may receive user inputs indicating functions, such as, e.g., a move made by a player, etc.

The enrollment module 320 may be a hardware-implemented module which may control enrollment of entities (e.g., a company, a public figure, an organization, etc.) so that those entities may promote a particular cause through gameplay viewable via the public medium. For example, a public figure wishing to promote a particular charity may enroll with the game networking system 108.2 via the enrollment module 320. The entity enrolling may indicate any preferences for promoting the gameplay, such as, e.g., which game is to be played publicly, who the players will be (e.g., public figures, players selected from a pool of potential players, etc.), how a player may be selected from a pool of potential players (e.g., lottery drawing, auction, etc.). Additionally, the entity may indicate where any proceeds from the promotion may be sent. In some embodiments, a payment account may be created when the entity enrolls so that proceeds may be sent to a specified location. In some embodiments, the enrollment module 320 may be configured to collect payment from the entity for allowing promotion of a cause via the public medium. For example, if the enrolling entity wishes to use public gameplay as a channel for promoting a product, the enrolling entity may do so by paying a fee for allowing such promotion.

The player game entry module 325 may be a hardware-implemented module which may manage and control entry of potential players into the pool of potential players from which a player may be selected for gameplay. The player game entry module 325 may also manage and control selection of players from the pool of potential players for gameplay.

In some embodiments, the player game entry module 325 may allow active or passive entry of potential players, or a combination thereof. Active entry of potential players includes any entry into a game that is explicitly requested by the potential player. Examples of active entry into the pool of potential players include an entry form (e.g., physical form or online form) submitted by a potential player, a request submitted via any manner of communicating a request (e.g., email, telephone, SMS, fax, mail), etc. Passive entry of potential players includes any entry into a game that is implicitly requested by the potential player. In some embodiments, passive entry may occur automatically when a player takes a particular action which may trigger entry. Examples of passive entry into a pool of potential players may include entering a potential player based on actions taken by the potential player, such as, e.g., clicking on a particular link which may trigger entry, being the winner of, or obtaining a particular score in, a previously played game, etc. In some embodiments, an action taken by a player in a game may trigger entry of that player in another game (e.g., a particular move played, a particular score achieved, etc.). In that case, the game engine 305 may detect the occurrence of the triggering action and may notify the player game entry module 325 of such action so that the player game entry module 325 may enter that player into the pool of potential players.

In some embodiments, the player game entry module 325 may allow closed or open entry of potential players. Closed entry of potential players includes entering a closed group of players for gameplay in a game. For example, in a two-player game, the player game entry module 325 may select two specific players to play in the game. Open entry of potential players includes allowing an open group of players to play in a game. For example, the player game entry module 325 may receive suggestions for a game move in a game from any number of potential players and may choose a particular candidate move for use in the game based on any criteria (e.g., the highest-scoring suggested move, a randomly-chosen suggested move, etc.).

The game broadcaster module 330 may be a hardware-implemented module which may manage and execute one or more game broadcasts via a public medium, such as a public website, a set-top box, television or radio, an RSS news feed, or the like. In some embodiments, the game broadcaster module 330 may access game details of a game from the game engine 305 and broadcast the game via the public medium using the game details accessed from the game engine 305. The game broadcaster module 330 may broadcast the game in any manner. In some embodiments, the game broadcaster module 330 may provide a streamable video of the game.

Figure 4:
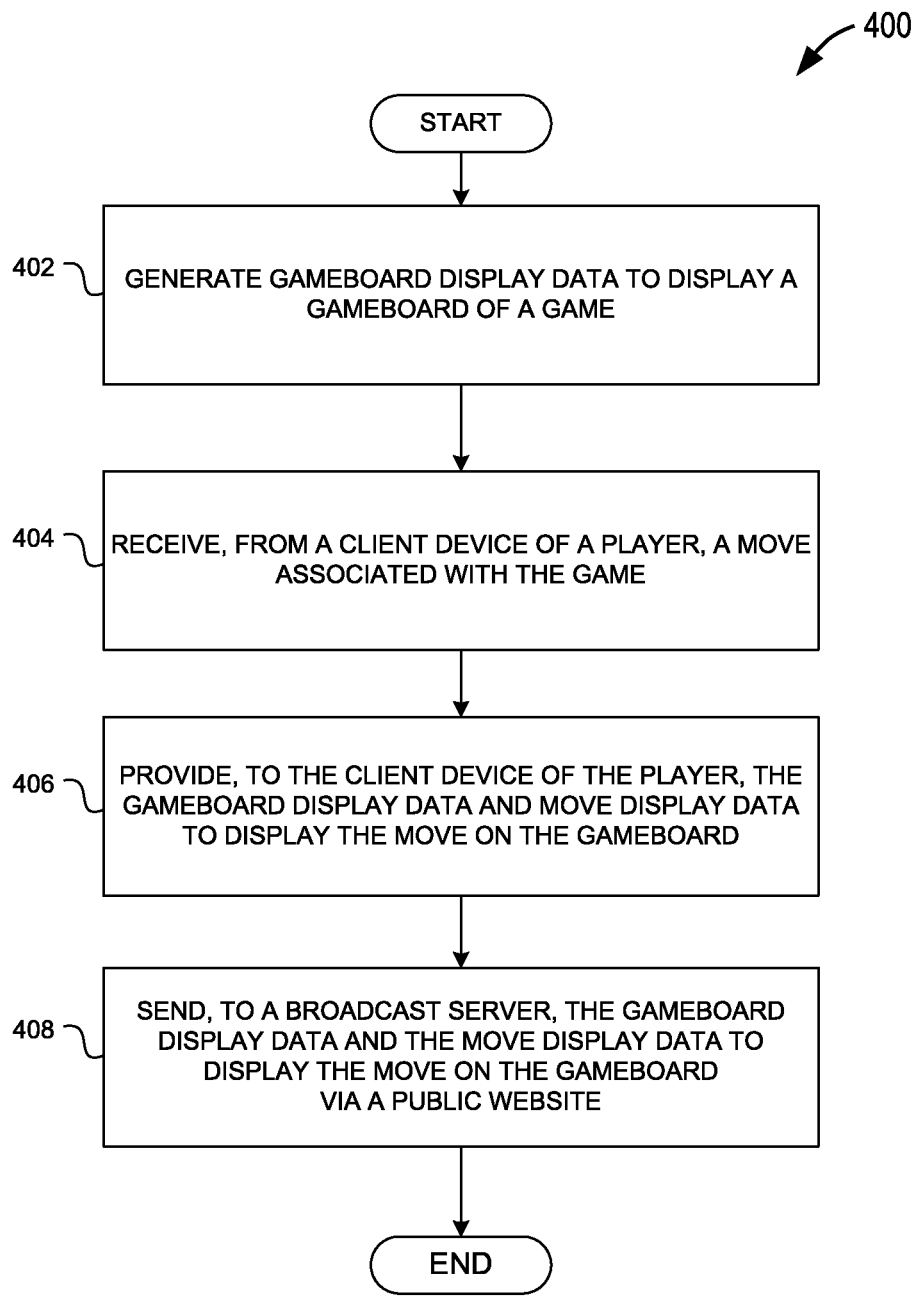
FIG. 4 is a flowchart showing an example method of providing game information to a broadcast server, according to some embodiments.

FIG. 4 is a flowchart showing an example method 400 of providing game information associated with a game to a broadcast server (e.g., game broadcaster module 330 of FIG. 3) so that the game may be broadcast via a public medium. The game that is broadcast may be played by a player of the game via a user interface on a client device of the player. The game may also be accessible by the public via a public medium. In operation 402, the game engine 305 of FIG. 3 may generate gameboard display data to display a gameboard of a game to be broadcast via the public medium. In operation 404, the game engine 305 receives, from a client device of a player, a move associated with the game. In response to the move received, in operation 406, the game engine 305 may provide to the client device of the player, the gameboard display data and move display data to display the move on the gameboard via the client device of the player. In operation 408, the game engine 305 may also send the gameboard display data and the move display data to the broadcast server to display the move on the gameboard via a medium accessible by the public.

Figure 5:
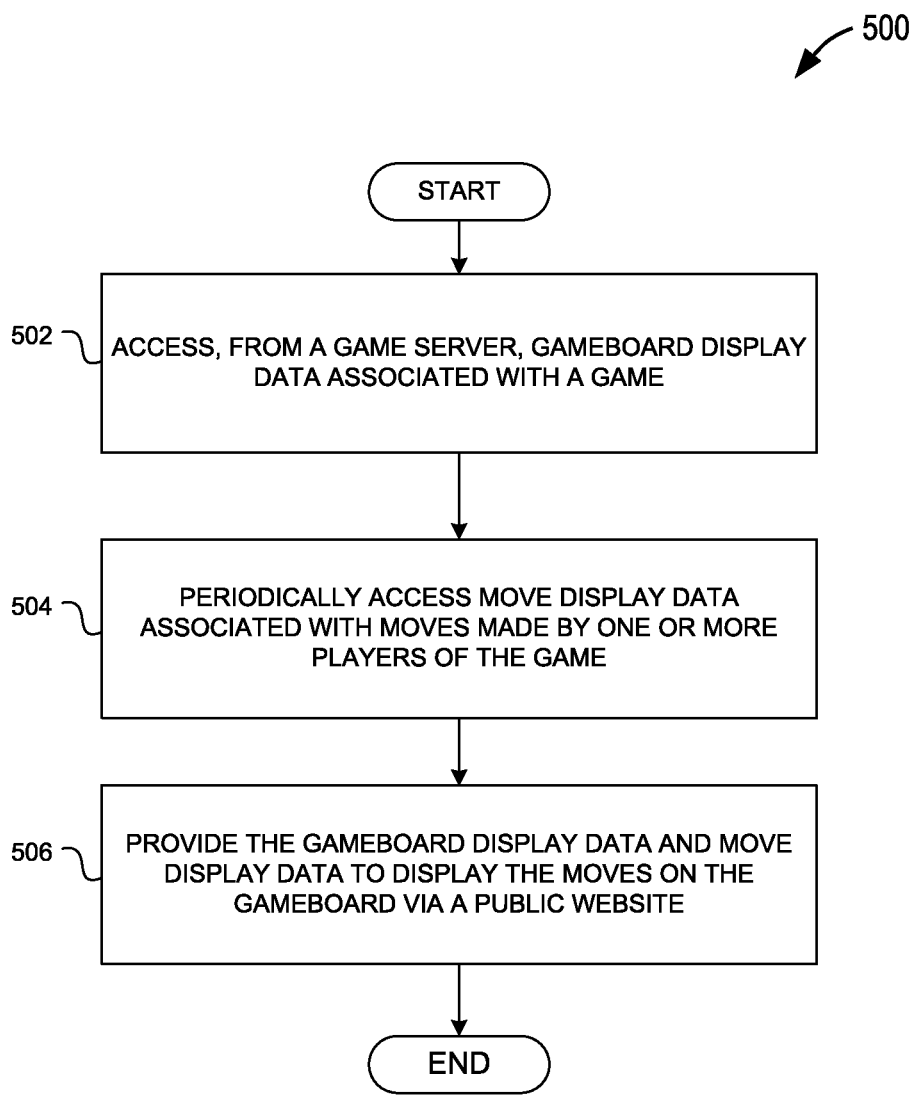
FIG. 5 is a flowchart showing an example method of accessing game information from a game server, according to some embodiments.

FIG. 5 is a flowchart showing an example method 500 of accessing game information associated with a game from a game server (e.g., game engine 305 of FIG. 3). The game information may be accessed from the game server by the game broadcaster module 330 of FIG. 3 so that the game may be broadcast via the public medium. In operation 502, the game broadcaster module 330 may access, from a game server, gameboard display data associated with a game. In operation 504, the game broadcaster module 330 may periodically access move display data associated with moves made by one or more players of the game. The move display data is periodically accessed or polled so that the any new moves made by players may be broadcast via the public medium in approximately real-time. In operation 506, the gameboard display data and move display data are provided via the public medium to display the moves on the gameboard to the public. Operation 506 may be performed as new move display data is accessed from the game server in operation 504.

Figure 6:
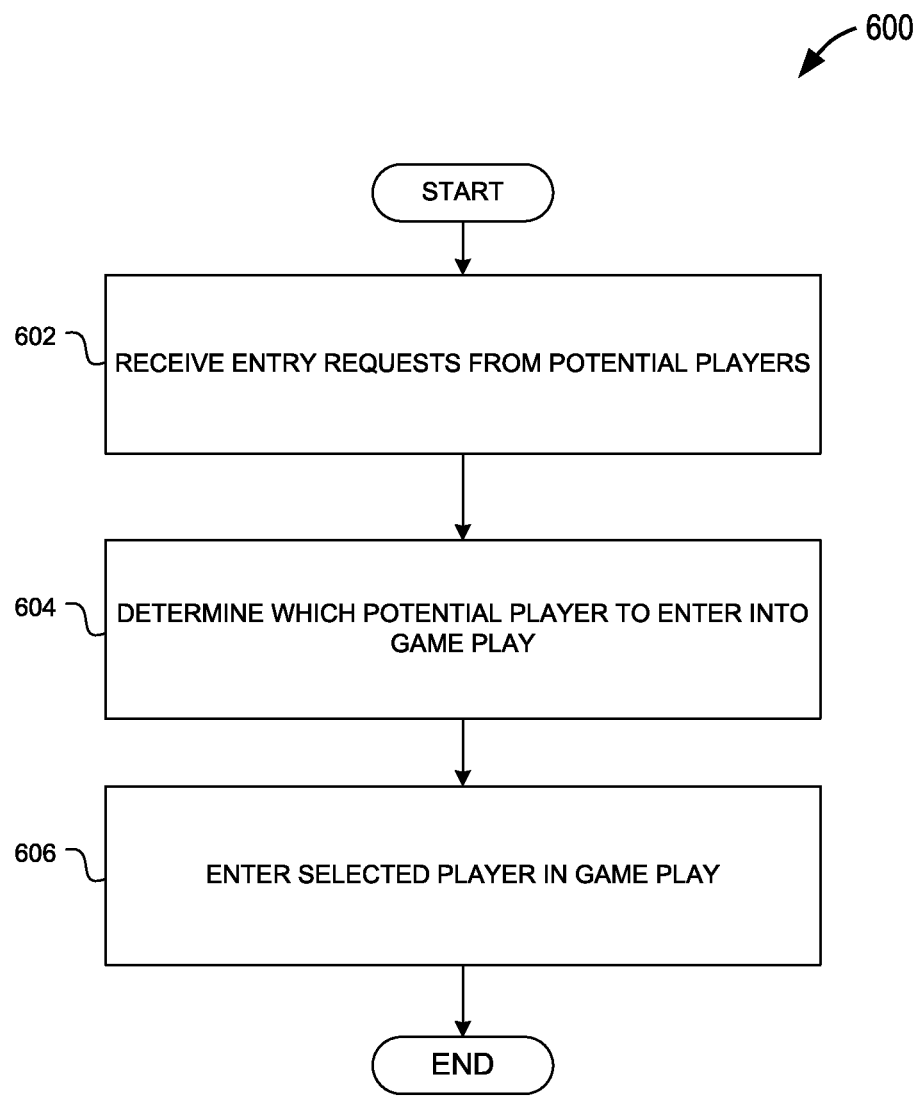
FIG. 6 is a flowchart showing an example method of active player entry into a game, according to some embodiments.

FIG. 6 is a flowchart showing an example method 600 of active player entry into a game. When players are to be selected for a particular game using the active entry mode, in operation 602, the player game entry module 325 of FIG. 3 may receive entry requests explicitly submitted by potential players. The entry requests may be received from the potential players in any manner. Examples of active entry requests include submitting an entry form, placing a monetary bid for entry, submitting a request via mail, telephone, email, fax, etc.

Once entry requests have been received, in operation 604, the player game entry module 325 may determine which potential player from the pool of potential players to enter into gameplay. The player may be selected based on any criteria for choosing a player. In some embodiments, the potential player placing the highest monetary bid may be allowed to play in the game. In some embodiments, a player may be selected through a random drawing of entries received from potential players.

After a player is selected by the player game entry module 325, in operation 606, the selected player may be entered into the game. The player game entry module 325 may send a notification of the selected player to the game engine 305, and the game engine may initiate gameplay of the game for the selected player.

Figure 7:
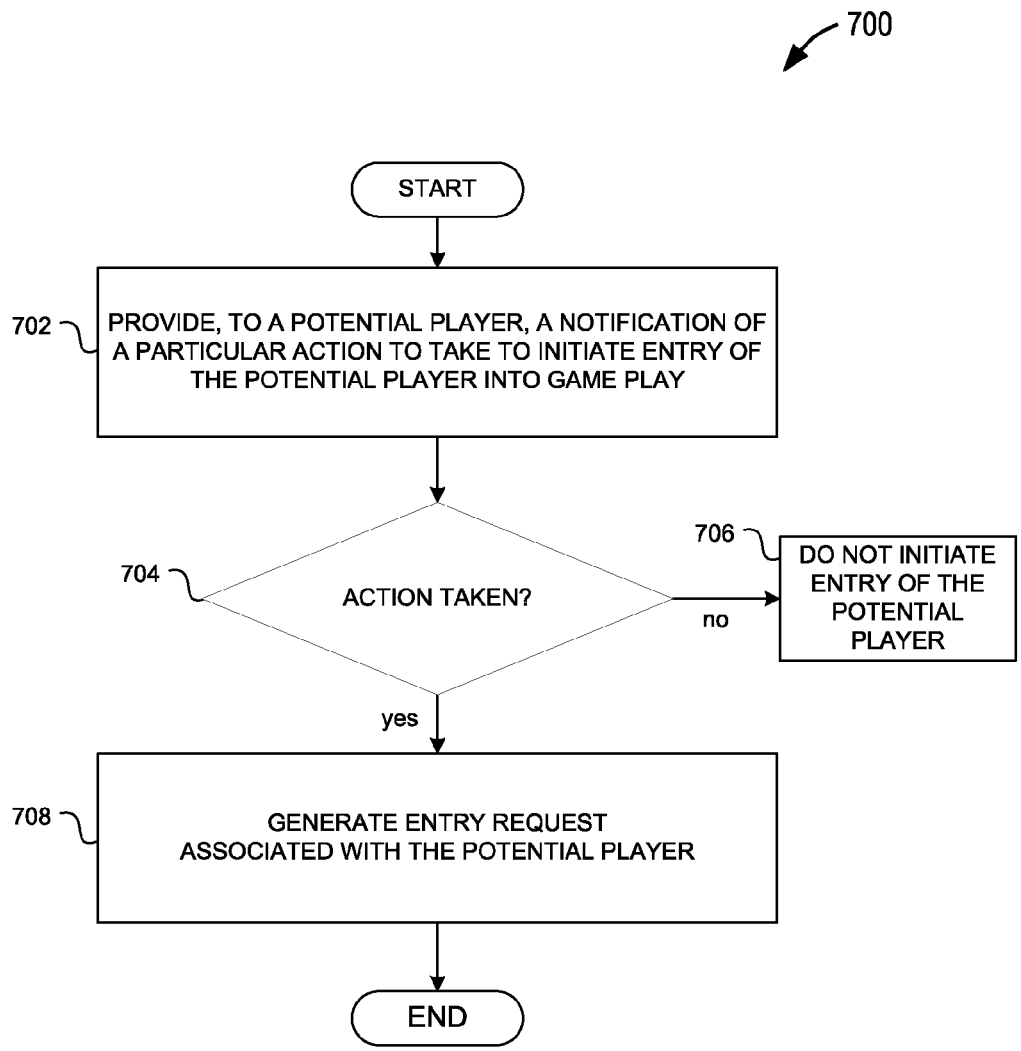
FIG. 7 is a flowchart showing an example method of passive player entry into a game, according to some embodiments.

FIG. 7 is a flowchart showing an example method 700 of passive player entry into a game. When players are to be selected for a particular game using the passive entry mode, in operation 702, the player game entry module 325 of FIG. 3 may provide to a potential player a notification of a particular action to take to initiate entry of the potential player into gameplay. Examples of actions that a player may take to initiate entry of the potential player include clicking on a particular link specified in the notification, submitting a particularly specified web form, etc.

In some embodiments, passive entry may occur automatically when a particular action occurs, even if the potential player is not notified about the particular action to take. For example, automatic entry may occur if the player clicks on a particular link, even if the player is not first notified that clicking on the link would trigger entry. In some embodiments, a winner of a game or a player receiving a particular score in a game may be entered into the pool of potential players.

In operation 704, the game networking system 108.2 of FIG. 3 may determine whether the particular action that may trigger entry was taken by the potential player. If the particular action is not taken, in operation 706, the player game entry module 325 of FIG. 3 will not initiate entry of the potential player. The player game entry module 325 may continuously check whether the action was taken until either the action is taken by the player or until the player game entry module 325 no longer accepts entries from potential players.

If the action was taken by the potential player, in operation 708, the player game entry module 325 may generate an entry request associated with the potential player. The entry requests received from the pool of potential players may then be used to select a player to play in a game in any manner of selection (e.g., random drawing).

Figure 8:
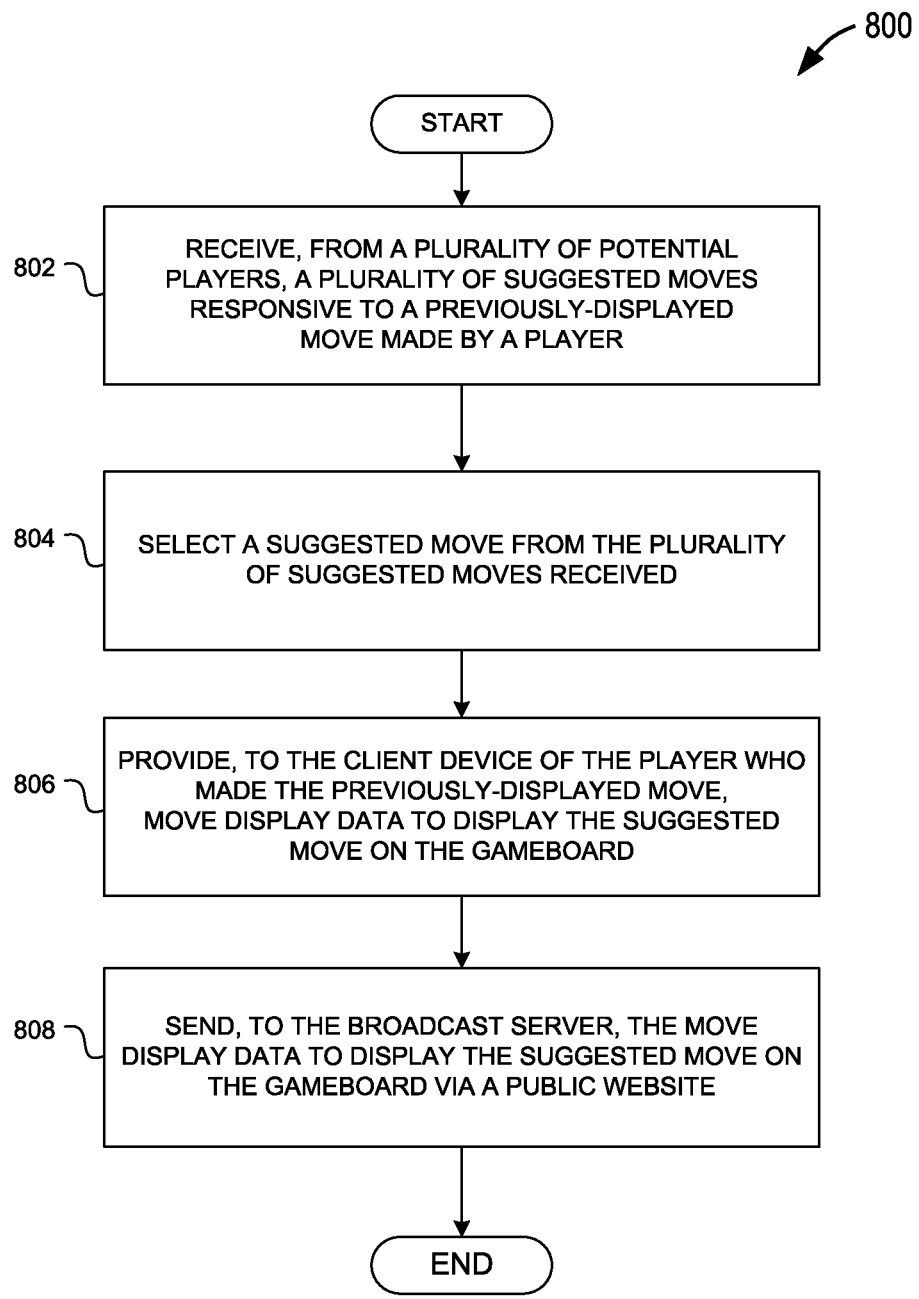
FIG. 8 is a flowchart showing an example method of open player entry into a game, according to some embodiments.

FIG. 8 is a flowchart showing an example method 800 of open player entry into a game. As described above, open player entry into a game may allow potential players to suggest candidate moves in a game. From the received suggestions, a move will be selected and used in gameplay. In operation 802, the player game entry module 325 of FIG. 3 may receive, from a plurality of potential players, a plurality of suggested moves. These suggested moves may be responsive to a previously-displayed move made by another player in the game. For example, in a two-player game, Player A may make a move on the gameboard. The move made on the gameboard by Player A may be displayed to spectators via the public medium. From there, spectators may send suggestions for moves that may be responsive to Player A's move.

In some embodiments, player game entry module 325 may notify potential players via the public medium that suggested moves may be submitted. In some embodiments, suggested moves may be submitted within a particular specified amount of time. For example, the player game entry module 325 may notify potential players to submit their suggested moves within five minutes from when the previous move was played. The player game entry module 325 may accept moves submitted by potential players. Examples of ways in which a potential player may submit a suggested move include submitting a move via their game client, a text message, an email, a web form, a fax, a telephone call, etc.

Once the suggested moves have been received, in operation 804, the player game entry module 325 may select a suggested move from the plurality of suggested moves received. The suggested move may be selected based on any criteria. For example, the highest scoring suggested move may be selected, or the suggested move may be selected at random, etc.

In some embodiments, the selected move may be used in gameplay on behalf of another player. For example, if Player A submitted the previously-displayed move upon which the suggested moves were based, Player B may use the suggested move that was selected by the player game entry module 325. In some embodiments, the selected move may be played on behalf of a computer-generated player entity. For example, if Player A submitted the previously-displayed move upon which the suggested moves were based, potential players may submit moves in an attempt to defeat Player A, and the suggested move selected by the player game entry module 325 may be used against Player A without an actual person representing Player A's opponent.

The game engine 305 of FIG. 3 may use the selected move to generate move display data. In operation 806, the generated move display data may be provided to the client device of the player who made the previously-displayed move (e.g., Player A) to display the move on the gameboard via the client device of that player.

In operation 808, the move display data generated by the game engine 305 may be sent to the broadcast server to display the suggested move on the gameboard via a public medium.

Figure 9:
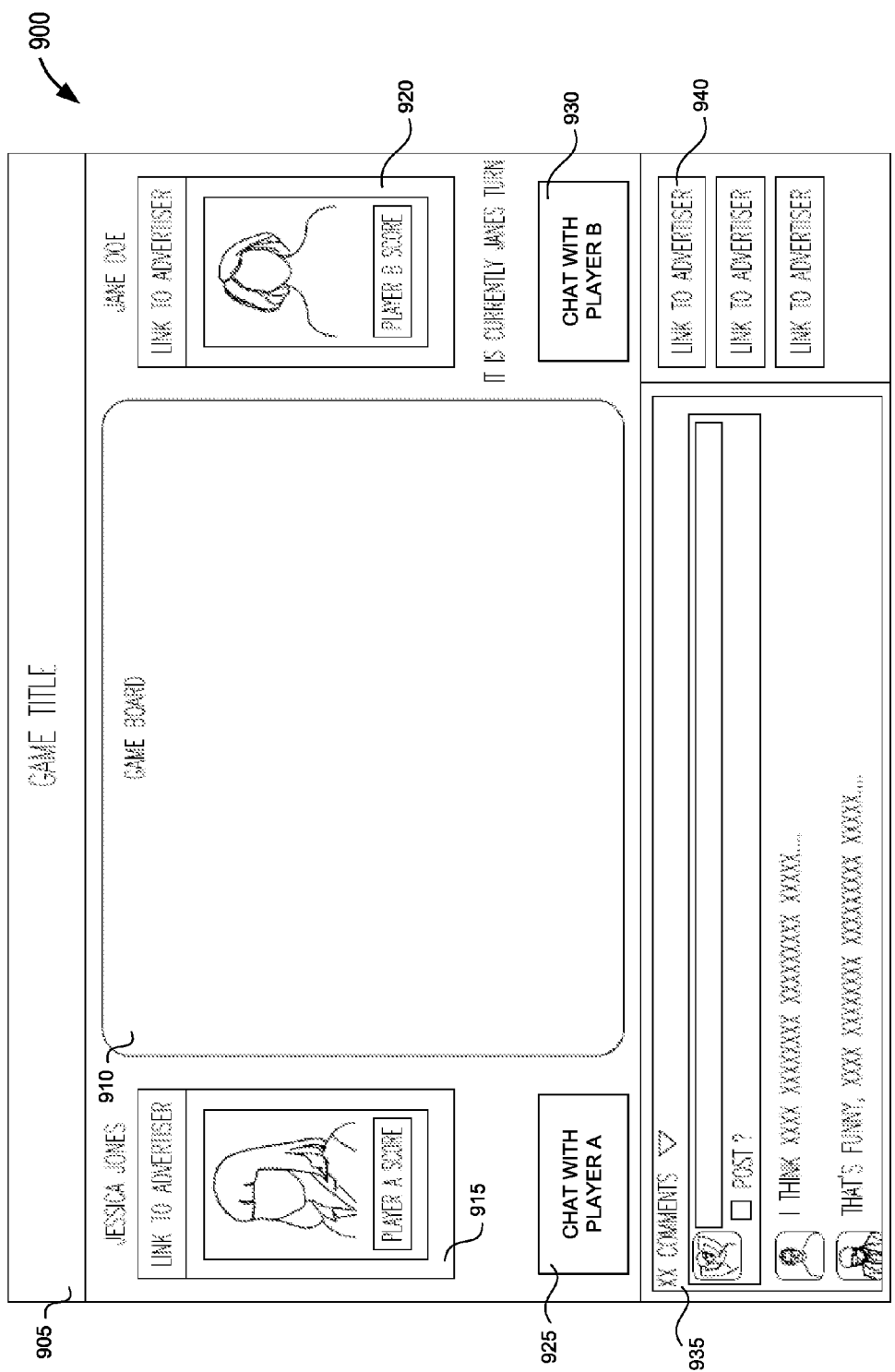
FIG. 9 is an interface diagram illustrating an example game user interface on a public medium, according to some embodiments.

FIG. 9 is an interface diagram illustrating an example game user interface 900 on a public medium (in this example, a website) for a particular two-player game (indicated by the game title 905). The game user interface 900 may include the gameboard 910 of the game, which may display moves played by Player A (e.g., Jessica Jones) and Player B (e.g., Jane Doe).

The game user interface 900 also includes an icon 915 for Player A and an icon 920 for Player B. In some embodiments, the icons 915 and 920 may include a link to an advertisement indicating an entity that each player is advocating. For example, if Player A is a celebrity who is playing to raise money for a particular charity, an advertisement for the charity may be included in the icon 915 for Player A. Each icon 915 and 925 may also display a photo of each player and each player's current score in the game.

The game user interface 900 may also include a user interface 925 for chatting with Player A and a user interface 930 for chatting with Player B. Each of these user interfaces 925 and 930 allows a spectator of the game to chat with a player. In some embodiments, the chat user interfaces 925 and 930 may allow spectators who have entered for a chance to play in the game, or who have donated or contributed to a sponsored charity, the ability to chat with Player A and/or Player B.

The game user interface 900 may also include a portion for displaying general public comments 935. The public comments section 935 may allow spectators to post comments viewable by anyone accessing the public medium. The game user interface may also include one or more links 940 to an advertiser advertising on the public medium.

Storing Game-Related Data

A database may store any data relating to gameplay within a game networking system 108.2. The database may include records for storing a player game state that may include information about the player's virtual gameboard, the player's character, or other game-related information. For example, player game state may include virtual objects owned or used by the player, placement positions for virtual structural objects on the player's virtual gameboard, and the like. Player game state may also include in-game objectives for the player (e.g., new objectives, current objectives, completed objectives, etc.), the player's character attributes (e.g., character health, character energy, amount of coins, amount of cash or virtual currency, etc.), and the like.

The database may also include records for storing a player profile that may include user-provided player information that is gathered from the player, the player's client device, or an affiliate social network. The user-provided player information may include the player's demographic information, the player's location information (e.g., a historical record of the player's location during gameplay as determined via a GPS-enabled device or the internet protocol (IP) address for the player's client device), the player's localization information (e.g., a list of languages chosen by the player), the types of games played by the player, and the like.

In some example embodiments, the player profile may also include derived player information that may be determined from other information stored in the database. The derived player information may include information that indicates the player's level of engagement with the virtual game, the player's friend preferences, the player's reputation, the player's pattern of game-play, and the like. For example, the game networking system 108.2 may determine the player's friend preferences based on player attributes that the player's first-degree friends have in common, and may store these player attributes as friend preferences in the player profile. Furthermore, the game networking system 108.2 may determine reputation-related information for the player based on user-generated content (UGC) from the player or the player's $N^{th}$ degree friends (e.g., in-game messages or social network messages), and may store this reputation-related information in the player profile. The derived player information may also include information that indicates the player's character temperament during gameplay, anthropological measures for the player (e.g., tendency to like violent games), and the like.

In some example embodiments, the player's level of engagement may be indicated from the player's performance within the virtual game. For example, the player's level of engagement may be determined based on one or more of the following: a play frequency for the virtual game or for a collection of virtual games; an interaction frequency with other players of the virtual game; a response time for responding to in-game actions from other players of the virtual game; and the like.

In some example embodiments, the player's level of engagement may include a likelihood value indicating a likelihood that the player may perform a desired action. For example, the player's level of engagement may indicate a likelihood that the player may choose a particular environment, or may complete a new challenge within a determinable period of time from when it is first presented to him.

In some example embodiments, the player's level of engagement may include a likelihood that the player may be a leading player of the virtual game (a likelihood to lead). The game networking system 108.2 may determine the player's likelihood to lead value based on information from other players that interact with this player. For example, the game networking system 108.2 may determine the player's likelihood to lead value by measuring the other players' satisfaction in the virtual game, measuring their satisfaction from their interaction with the player, measuring the game-play frequency for the other players in relation to their interaction frequency with the player (e.g., the ability for the player to retain others), and/or the like.

The game networking system 108.2 may also determine the player's likelihood to lead value based on information about the player's interactions with others and the outcome of these interactions. For example, the game networking system 108.2 may determine the player's likelihood to lead value by measuring the player's amount of interaction with other players (e.g., as measured by a number of challenges that the player cooperates with others, and/or an elapsed time duration related thereto), the player's amount of communication with other players, the tone of the communication sent or received by the player, and/or the like. Moreover, the game networking system 108.2 may determine the player's likelihood to lead value based on determining a likelihood for the other players to perform a certain action in response to interacting or communicating with the player and/or the player's virtual environment.

Example Game Systems, Social Networks, and Social Graphs

In a multiplayer game, players control player characters (PCs), a game engine controls non-player characters (NPCs), and the game engine also manages player character state and tracks states for currently active (e.g., online) players and currently inactive (e.g., offline) players. A player character may have a set of attributes and a set of friends associated with the player character. As used herein, the terms "state" and "attribute" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a player (or a group of more than one players), the game engine may take into account the state of the player character (or group of PCs) that is playing, but also the state of one or more PCs of offline/inactive players who are connected to the current player (or PC, or group of PCs) through the game social graph but are not necessarily involved in the game at the time.

For example, Player A with six friends on Player A's team (e.g., the friends that are listed as being in the player's mob/gang/set/army/business/crew/etc. depending on the nature of the game) may be playing the virtual game and choose to confront Player B who has 20 friends on Player B's team. In some embodiments, a player may only have first-degree friends on the player's team. In other embodiments, a player may also have second-degree and higher degree friends on the player's team. To resolve the game event, in some embodiments the game engine may total up the weapon strength of the seven members of Player A's team and the weapon strength of the 21 members of Player B's team and decide an outcome of the confrontation based on a random variable applied to a probability distribution that favors the side with the greater total. In some embodiments, all of this may be done without any other current active participants other than Player A (e.g., Player A's friends, Player, B, and Player B's friends could all be offline or inactive). In some embodiments, the friends in a player's team may see a change in their state as part of the outcome of the game event. In some embodiments, the state (assets, condition, level) of friends beyond the first degree are taken into account.

Example Game Networking Systems

A virtual game may be hosted by the game networking system 108.2 of FIG. 3, which can be accessed using any suitable connection 110 of FIG. 1 with a suitable client device 104 of FIG. 1. A player may have a game account on the game networking system 108.2, wherein the game account may contain a variety of information associated with the player (e.g., the player's personal information, financial information, purchase history, player character state, game state, etc.). In some embodiments, a player may play multiple games on the game networking system 108.2, which may maintain a single game account for the player with respect to the multiple games, or multiple individual game accounts for each game with respect to the player. In some embodiments, the game networking system 108.2 may assign a unique identifier to a player 102 of FIG. 1 of a virtual game hosted on the game networking system 108.2. The game networking system 108.2 may determine that the player 102 is accessing the virtual game by reading the user's cookies, which may be appended to HTTP requests transmitted by the client device 104, and/or by the player 102 logging onto the virtual game.

In some embodiments, the player 102 accesses a virtual game and control the game's progress via the client device 104 (e.g., by inputting commands to the game at the client device 104). The client device 104 can display the game interface, receive inputs from the player 102, transmit user inputs or other events to the game engine, and receive instructions from the game engine. The game engine can be executed on any suitable system (such as, for example, the client device 104, the social networking system 108.1 of FIG. 1, the game networking system 108.2, or the communication system 108.3 of FIG. 1). For example, the client device 104 may download client components of a virtual game, which are executed locally, while a remote game server, such as the game networking system 108.2, provides backend support for the client components and may be responsible for maintaining application data of the game, processing the inputs from the player 102, updating and/or synchronizing the game state based on the game logic and each input from the player 102, and transmitting instructions to the client device 104. As another example, when the player 102 provides an input to the game through the client device 104 (such as, for example, by typing on the keyboard or clicking the mouse of the client device 104), the client components of the game may transmit the player's input to the game networking system 108.2.

In some embodiments, the player 102 accesses particular game instances of a virtual game. A game instance is a copy of a specific gameplay area that is created during runtime. In some embodiments, a game instance is a discrete gameplay area where one or more players 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific players. A game instance is associated with a specific player when one or more game parameters of the game instance are associated with the specific player. For example, a game instance associated with a first player may be named "First Player's Play Area." This game instance may be populated with the first player's PC and one or more in-game objects associated with the first player.

In some embodiments, a game instance associated with a specific player is only accessible by that specific player. For example, a first player may access a first game instance when playing a virtual game, and this first game instance may be inaccessible to all other players. In other embodiments, a game instance associated with a specific player is accessible by one or more other players, either synchronously or asynchronously with the specific player's gameplay. For example, a first player may be associated with a first game instance, but the first game instance may be accessed by all first-degree friends in the first player's social network.

In some embodiments, the set of in-game actions available to a specific player is different in a game instance that is associated with this player compared to a game instance that is not associated with this player. The set of in-game actions available to a specific player in a game instance associated with this player may be a subset, superset, or independent of the set of in-game actions available to this player in a game instance that is not associated with him. For example, a first player may be associated with Blackacre Farm in an online farming game, and may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In some embodiments, a game engine interfaces with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a player or player character in a multiplayer game.

In some embodiments, the social graph is managed by the game networking system 108.2, which is managed by the game operator. In other embodiments, the social graph is part of a social networking system 108.1 managed by a third party (e.g., Facebook, Friendster, Myspace). In yet other embodiments, the player 102 has a social network on both the game networking system 108.2 and the social networking system 108.1, wherein the player 102 can have a social network on the game networking system 108.2 that is a subset, superset, or independent of the player's social network on the social networking system 108.1. In such combined systems, game network system 108.2 can maintain social graph information with edge-type attributes that indicate whether a given friend is an "in-game friend," an "out-of-game friend," or both. The various embodiments disclosed herein are operable when the social graph is managed by the social networking system 108.1, the game networking system 108.2, or both.

Example Systems and Methods

Returning to FIG. 2, the Player 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to Player 201. As used herein, the terms "player" and "user" can be used interchangeably and can refer to any user in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In social graph 200, it is possible for individuals to be connected to other individuals through their first-degree friends (e.g., friends of friends). As described above, the number of edges in a minimum path that connects a player to another user is considered the degree of separation. For example, FIG. 2 shows that Player 201 has three second-degree friends to which Player 201 is connected via Player 201's connection to Player 201's first-degree friends. Second-degree Friend $1_2$ 212 and Friend $2_2$ 222 are connected to Player 201 via Player 201's first-degree Friend $1_1$ 211. The limit on the depth of friend connections, or the number of degrees of separation for associations, that Player 201 is allowed is typically dictated by the restrictions and policies implemented by the social networking system 108.1.

In various embodiments, Player 201 can have Nth-degree friends connected to him through a chain of intermediary degree friends as indicated in FIG. 2. For example, Nth-degree Friend $1_N$ 219 is connected to Player 201 within in-game social network 260 via second-degree Friend $3_2$ 232 and one or more other higher-degree friends.

In some embodiments, a player (or player character) has a social graph within a multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in Player 201's out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in Player 201's in-game social network 260. In some embodiments, a game engine can access in-game social network 260, out-of-game social network 250, or both.

In some embodiments, the connections in a player's in-game social network are formed both explicitly (e.g., when users "friend" each other) and implicitly (e.g., when the system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (e.g., in disintermediated interactions or the like), but that could be the case.

Figure 10:
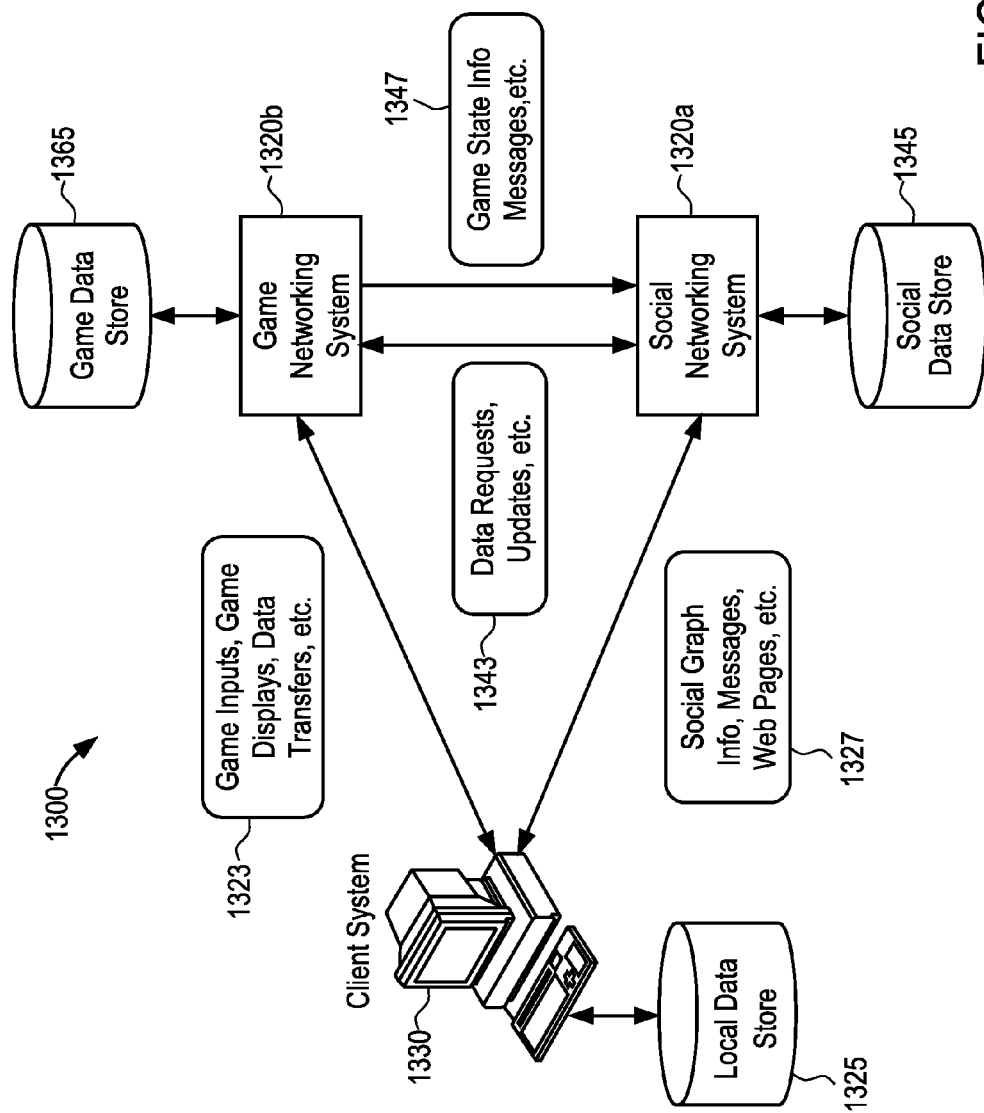
FIG. 10 is a diagrammatic representation of an example data flow between example components of the example system of FIG. 1, according to some embodiments.

FIG. 10 is a diagrammatic representation of an example data flow between example components of an example system 1300. One or more of the components of the example system 1300 may correspond to one or more of the components of the example system 100 of FIG. 1. In some embodiments, system 1300 includes a client system 1330, a social networking system 1320a, and a game networking system 1320b. The components of system 1300 can be connected to each other in any suitable configuration, using any suitable type of connection. The components may be connected directly or over any suitable network. The client system 1330, the social networking system 1320a, and the game networking system 1320b may have one or more corresponding data stores such as the local data store 1325, the social data store 1345, and the game data store 1365, respectively.

The client system 1330 may receive and transmit data 1323 to and from the game networking system 1320b. This data can include, for example, a web page, a message, a game input, a game display, a HTTP packet, a data request, transaction information, and other suitable data. At some other time, or at the same time, the game networking system 1320b may communicate data 1343, 1347 (e.g., game state information, game system account information, page info, messages, data requests, updates, etc.) with other networking systems, such as the social networking system 1320a (e.g., FACEBOOK, MYSPACE, etc.). The client system 1330 can also receive and transmit data 1327 to and from the social networking system 1320a. This data can include, for example, web pages, messages, social graph information, social network displays, HTTP packets, data requests, transaction information, updates, and other suitable data.

Communication between the client system 1330, the social networking system 1320a, and the game networking system 1320b can occur over any appropriate electronic communication medium or network using any suitable communications protocols. For example, the client system 1330, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a player accesses a virtual game on the game networking system 1320b, the BLOB containing the game state for the instance corresponding to the player may be transmitted to the client system 1330 for use by a client-side executed object to process. In some embodiments, the client-side executable is a FLASH™-based game, which can de-serialize the game state data in the BLOB. As a player plays the game, the game logic implemented at the client system 1330 maintains and modifies the various game state parameters locally. The client-side game logic may also batch game events, such as mouse clicks, and transmit these events to the game networking system 1320b. Game networking system 1320b may itself operate by retrieving a copy of the BLOB from a database or an intermediate memory cache (memcache) layer. The game networking system 1320b can also de-serialize the BLOB to resolve the game state parameters and execute its own game logic based on the events in the batch file of events transmitted by the client to synchronize the game state on the server side. The game networking system 1320*b* may then re-serialize the game state, now modified into a BLOB, and pass this to a memory cache layer for lazy updates to a persistent database.

In some embodiments, a computer-implemented game is a text-based or turn-based game implemented as a series of web pages that are generated after a player selects one or more actions to perform. The web pages may be displayed in a browser client executed on the client system 1330. For example, a client application downloaded to the client system 1330 may operate to serve a set of web pages to a player. As another example, a virtual game may be an animated or rendered game executable as a stand-alone application or within the context of a webpage or other structured document. In some embodiments, the virtual game is implemented using ADOBE™ FLASH™-based technologies. As an example, a game may be fully or partially implemented as a SWF object that is embedded in a web page and executable by a FLASH™ media player plug-in. In some embodiments, one or more described web pages is associated with or accessed by the social networking system 1320*a*. This disclosure contemplates using any suitable application for the retrieval and rendering of structured documents hosted by any suitable network-addressable resource or website.

Application event data of a game is any data relevant to the game (e.g., player inputs). In some embodiments, each application datum may have a name and a value, and the value of the application datum may change (e.g., be updated) at any time. When an update to an application datum occurs at the client system 1330, either caused by an action of a game player or by the game logic itself, the client system 1330 may need to inform the game networking system 1320*b* of the update. For example, if the game is a farming game with a harvest mechanic (such as ZYNGA™ FARMVILLE™), an event can correspond to a player clicking on a parcel of land to harvest a crop. In such an instance, the application event data may identify an event or action (e.g., harvest) and an object in the game to which the event or action applies.

In some embodiments, one or more objects of a game may be represented as any one of an ADOBE™ FLASH™ object, MICROSOFT™ SILVERLIGHT™ object, HTML 5 object, etc. FLASH™ may manipulate vector and raster graphics, and supports bidirectional streaming of audio and video. "FLASH™" may mean the authoring environment, the player, or the application files. In some embodiments, the client system 1330 may include a FLASH™ client. The FLASH™ client may be configured to receive and run FLASH™ application or game object code from any suitable networking system (such as, for example, the social networking system 1320*a* or the game networking system 1320*b*). In some embodiments, the FLASH™ client is run in a browser client executed on the client system 1330. A player can interact with FLASH™ objects using the client system 1330 and the FLASH™ client. The FLASH™ objects can represent a variety of in-game objects. Thus, the player may perform various in-game actions on various in-game objects by making various changes and updates to the associated FLASH™ objects.

In some embodiments, in-game actions are initiated by clicking or similarly interacting with a FLASH™ object that represents a particular in-game object. For example, a player can interact with a FLASH™ object to use, move, rotate, delete, attack, shoot, or harvest an in-game object. This disclosure contemplates performing any suitable in-game action by interacting with any suitable FLASH™ object. In some embodiments, when the player makes a change to a FLASH™ object representing an in-game object, the client-executed game logic may update one or more game state parameters associated with the in-game object. To ensure synchronization between the FLASH™ object shown to the player at the client system 1330, the FLASH™ client may send the events that caused the game state changes to the in-game object to the game networking system 1320*b*. However, to expedite the processing and hence the speed of the overall gaming experience, the FLASH™ client may collect a batch of some number of events or updates into a batch file. The number of events or updates may be determined by the FLASH™ client dynamically or determined by the game networking system 1320*b* based on server loads or other factors. For example, client system 1330 may send a batch file to the game networking system 1320*b* whenever 50 updates have been collected or after a threshold period of time, such as every minute.

As used herein, the term "application event data" may refer to any data relevant to a computer-implemented virtual game application that may affect one or more game state parameters, including, for example and without limitation, changes to player data or metadata, changes to player social connections or contacts, player inputs to the game, and events generated by the game logic. In some embodiments, each application datum has a name and a value. The value of an application datum may change at any time in response to the gameplay of a player or in response to the game engine (e.g., based on the game logic). In some embodiments, an application data update occurs when the value of a specific application datum is changed.

In some embodiments, when a player plays a virtual game on the client system 1330, the game networking system 1320*b* serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular player and a particular virtual game. In some embodiments, while a player is not playing the virtual game, the corresponding BLOB may be stored in the database. This enables a player to stop playing the game at any time without losing the current state of the game the player is in. When a player resumes playing the game next time, game networking system 1320*b* may retrieve the corresponding BLOB from the database to determine the most-recent values of the game-related data. In some embodiments, while a player is playing the virtual game, the game networking system 1320*b* also loads the corresponding BLOB into a memory cache so that the game system may have faster access to the BLOB and the game-related data contained therein.

Figure 11:
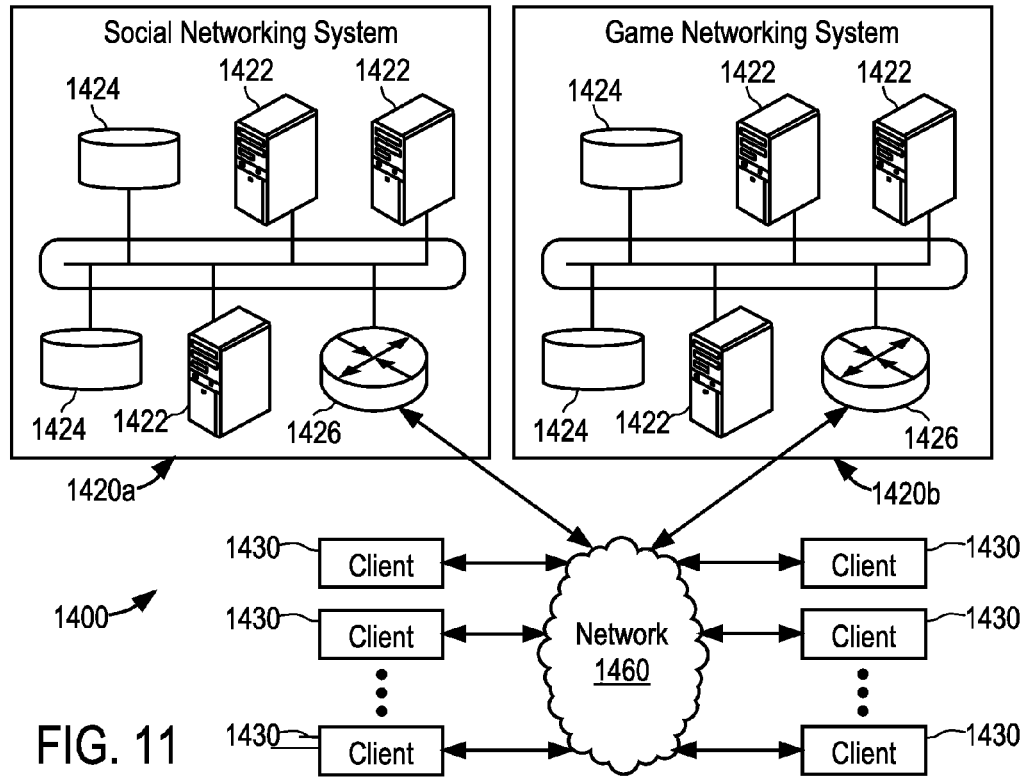
FIG. 11 is a schematic diagram showing an example network environment, in which various example embodiments may operate, according to some embodiments.

Various embodiments may operate in a wide area network environment, such as the Internet, including multiple network addressable systems. FIG. 11 is a schematic diagram showing an example network environment 1400, in which various example embodiments may operate. Network cloud 1460 generally represents one or more interconnected networks, over which the systems and hosts described herein can communicate. Network cloud 1460 may include packet-based wide area networks (such as the Internet), private networks, wireless networks, satellite networks, cellular networks, paging networks, and the like. As FIG. 11 illustrates, various embodiments may operate in a network environment 1400 comprising one or more networking systems, such as a social networking system 1420a, a game networking system 1420b, and one or more client systems 1430. The components of the social networking system 1420a and the game networking system 1420b operate analogously; as such, hereinafter they may be referred to simply as the networking system 1420. The client systems 1430 are operably connected to the network environment 1400 via a network service provider, a wireless carrier, or any other suitable means.

The networking system 1420 is a network addressable system that, in various example embodiments, comprises one or more physical servers 1422 and data stores 1424. The one or more physical servers 1422 are operably connected to computer network cloud 1460 via, by way of example, a set of routers and/or networking switches 1426. In an example embodiment, the functionality hosted by the one or more physical servers 1422 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), FLASH™, ActionScript, and the like.

The physical servers 1422 may host functionality directed to the operations of the networking system 1420. Hereinafter servers 1422 may be referred to as server 1422, although the server 1422 may include numerous servers hosting, for example, the networking system 1420, as well as other content distribution servers, data stores, and databases. Data store 1424 may store content and data relating to, and enabling, operation of, the networking system 1420 as digital data objects. A data object, in some embodiments, is an item of digital information typically stored or embodied in a data file, database, or record. Content objects may take many forms, including: text (e.g., ASCII, SGML, HTML), images (e.g., JPEG, TIF and GIF), graphics (vector-based or bitmap), audio, video (e.g., MPEG), or other multimedia, and combinations thereof. Content object data may also include executable code objects (e.g., games executable within a browser window or frame), podcasts, etc.

Logically, data store 1424 corresponds to one or more of a variety of separate and integrated databases, such as relational databases and object-oriented databases, that maintain information as an integrated collection of logically related records or files stored on one or more physical systems. Structurally, data store 1424 may generally include one or more of a large class of data storage and management systems. In some embodiments, data store 1424 may be implemented by any suitable physical system(s) including components, such as one or more database servers, mass storage media, media library systems, storage area networks, data storage clouds, and the like. In one example embodiment, data store 1424 includes one or more servers, databases (e.g., MySQL), and/or data warehouses. Data store 1424 may include data associated with different networking system 1420 users and/or client systems 1430.

The client system 1430 is generally a computer or computing device including functionality for communicating (e.g., remotely) over a computer network. The client system 1430 may be a desktop computer, laptop computer, personal digital assistant (PDA), in- or out-of-car navigation system, smart phone or other cellular or mobile phone, or mobile gaming device, among other suitable computing devices. Client system 1430 may execute one or more client applications, such as a Web browser.

When a user at a client system 1430 desires to view a particular webpage (hereinafter also referred to as target structured document) hosted by the networking system 1420, the user's web browser, or other document rendering engine or suitable client application, formulates and transmits a request to the networking system 1420. The request generally includes a URL or other document identifier as well as metadata or other information. By way of example, the request may include information identifying the user, a timestamp identifying when the request was transmitted, and/or location information identifying a geographic location of the user's client system 1430 or a logical network location of the user's client system 1430.

Although the example network environment 1400 described above and illustrated in FIG. 11 is described with respect to the social networking system 1420a and the game networking system 1420b, this disclosure encompasses any suitable network environment using any suitable systems. For example, a network environment may include online media systems, online reviewing systems, online search engines, online advertising systems, or any combination of two or more such systems.

Figure 12:
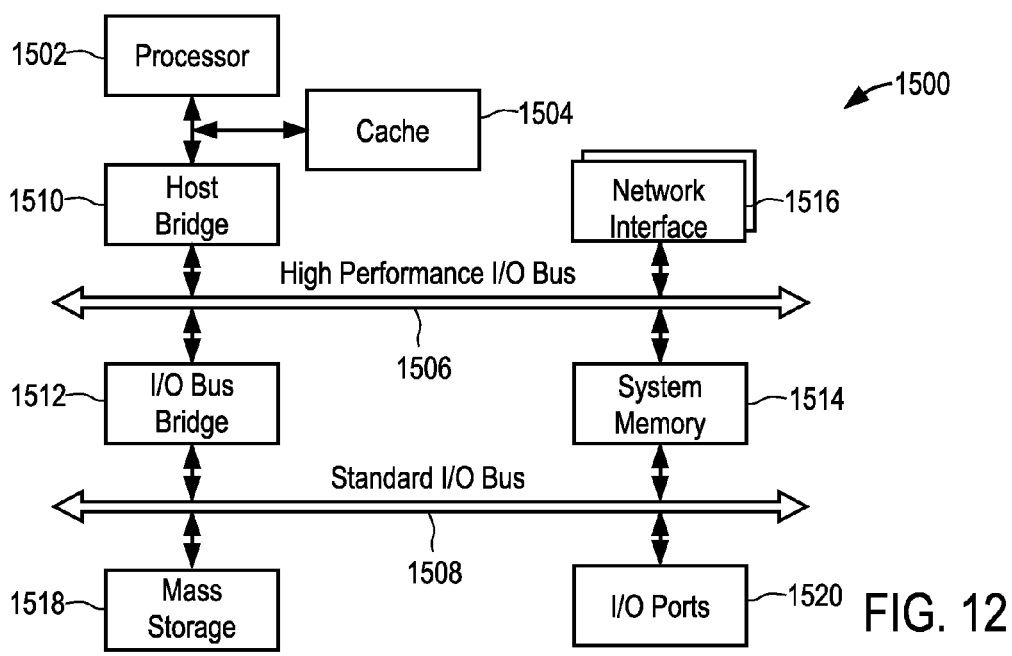
FIG. 12 is a block diagram illustrating an example computing system architecture, which may be used to implement one or more of the methodologies described herein, according to some embodiments.

FIG. 12 is a block diagram illustrating an example computing system architecture, which may be used to implement a server 1422 or a client system 1430 both of FIG. 11. In one embodiment, the hardware system 1500 comprises a processor 1502, a cache memory 1504, and one or more executable modules and drivers, stored on a tangible computer-readable storage medium, directed to the functions described herein. Additionally, the hardware system 1500 may include a high performance input/output (I/O) bus 1506 and a standard I/O bus 1508. A host bridge 1510 may couple the processor 1502 to the high performance I/O bus 1506, whereas the I/O bus bridge 1512 couples the two buses 1506 and 1508 to each other. A system memory 1514 and one or more network/communication interfaces 1516 may couple to the bus 1506. The hardware system 1500 may further include video memory (not shown) and a display device coupled to the video memory. Mass storage 1518 and I/O ports 1520 may couple to the bus 1508. The hardware system 1500 may optionally include a keyboard, a pointing device, and a display device (not shown) coupled to the bus 1508. Collectively, these elements are intended to represent a broad category of computer hardware systems.

The elements of the hardware system 1500 are described in greater detail below. In particular, the network interface 1516 provides communication between the hardware system 1500 and any of a wide range of networks, such as an Ethernet (e.g., IEEE 802.3) network, a backplane, etc. The mass storage 1518 provides permanent storage for the data and programming instructions to perform the above-described functions implemented in servers 1422 of FIG. 11, whereas system memory 1514 (e.g., DRAM) provides temporary storage for the data and programming instructions when executed by the processor 1502. I/O ports 1520 are one or more serial and/or parallel communication ports that provide communication between additional peripheral devices, which may be coupled to the hardware system 1500.

The hardware system 1500 may include a variety of system architectures and various components of the hardware system 1500 may be rearranged. For example, cache memory 1504 may be on-chip with the processor 1502. Alternatively, the cache memory 1504 and the processor 1502 may be packed together as a "processor module," with processor 1502 being referred to as the "processor core."

Furthermore, certain embodiments of the present disclosure may neither require nor include all of the above components. For example, the peripheral devices shown coupled to the standard I/O bus 1508 may couple to the high performance I/O bus 1506. In addition, in some embodiments, only a single bus may exist, with the components of the hardware system 1500 being coupled to the single bus. Furthermore, the hardware system 1500 may include additional components, such as additional processors, storage devices, or memories.

An operating system manages and controls the operation of the hardware system 1500, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
   transmitting, to a first player, a first advertisement for an opportunity to play a computer-implemented game against a second player, the second player being identified in the first advertisement, the first advertisement indicating that the computer-implemented game is displayable on a public medium accessible via a plurality of client devices;
   receiving a plurality of notifications that a particular move has been made in a different game by a plurality of corresponding players of the different game;
   responsive to each of the plurality of notifications, entering the corresponding player into a pool of potential players, the pool of potential players being larger than a number of players supported by the computer-implemented game;
   selecting, from among the pool of potential players, the first player from the plurality of potential players;
   generating, using a processor of a machine, gameboard display data to display a gameboard of the computer-implemented game; and
   sending, to a broadcast server, the gameboard display data to be displayed on the public medium.

2. The method of claim 1, wherein the gameboard display data includes a second advertisement, the second advertisement being for an entity advocated by the second player.

3. The method of claim 2, wherein the entity advocated by the second player is a charity.

4. The method of claim 1, wherein the computer-implemented game is a two-player computer-implemented game.

5. A non-transitory machine-readable medium having instructions embodied thereon, which, when executed by one or more processors, cause the one or more processors to perform operations, comprising:
   transmitting, to a first player, a first advertisement for an opportunity to play a computer-implemented game against a second player, the second player being identified in the first advertisement, the first advertisement indicating that the computer-implemented game is displayable on a public medium accessible via a plurality of client devices;
   receiving a plurality of notifications that a particular move has been made in a different game by a plurality of corresponding players of the different game;
   responsive to each of the plurality of notifications, entering the corresponding player into a pool of potential players, the pool of potential players being larger than a number of players supported by the computer-implemented game;
   selecting, from among the pool of potential players, the first player from the plurality of potential players;
   generating gameboard display data to display a gameboard of the computer-implemented game; and
   sending, to a broadcast server, the gameboard display data to be displayed on the public medium.

6. The non-transitory machine-readable medium of claim 5, wherein the computer-implemented game is a two-player computer-implemented game.

7. A system, comprising:
   a memory having instructions embodied thereon;
   a processor configured to execute the instructions to perform operations comprising:
      transmitting, to a first player, a first advertisement for an opportunity to play a computer-implemented game against a second player, the second player being identified in the first advertisement, the first advertisement indicating that the computer-implemented game is displayable on a public medium accessible via a plurality of client devices;
      receiving a plurality of notifications that a particular move has been made in a different game by a plurality of corresponding players of the different game;
      responsive to each of the plurality of notifications, entering the corresponding player into a pool of potential players, the pool of potential players being larger than a number of players supported by the computer-implemented game;
      selecting, from among the pool of potential players, the first player from the plurality of potential players;
      generating gameboard display data to display a gameboard of the computer-implemented game; and
      sending, to a broadcast server, the gameboard display data to be displayed via the public medium.

8. The game networking system of claim 7, wherein the operations further comprise providing, via the public medium, a streamable video of the game on the gameboard.

9. The game networking system of claim 7, wherein the operations further comprise providing, to a client device of a user, chat user interface display data to display a chat user interface via the public medium, the chat user interface allowing the user to chat with the first player.

10. The game networking system of claim 9, wherein:
the gameboard display data includes a second advertisement for a charity advocated by the second player; and
the chat user interface is provided to the client device of the user responsive to a determination that the user has donated to a charity advocated by the second player.

11. The system of claim 7, wherein the computer-implemented game is a two-player computer-implemented game.

\* \* \* \* \*

UNITED STATES PATENT AND TRADEMARK OFFICE
CERTIFICATE OF CORRECTION

PATENT NO.       : 9,446,321 B1
APPLICATION NO.  : 13/433603
DATED            : September 20, 2016
INVENTOR(S)      : Graham et al.

It is certified that error appears in the above-identified patent and that said Letters Patent is hereby corrected as shown below:

On page 2, in Column 2, under "Other Publications", Line 17, delete "Apr. 13, 2014" and insert --May 13, 2014--, therefor Signed and Sealed this
Thirteenth Day of March, 2018

Andrei Iancu
*Director of the United States Patent and Trademark Office*